United States Patent [19]

Oda et al.

[11] 4,316,965
[45] Feb. 23, 1982

[54] LOW-EXPANSION CERAMICS AND METHOD OF PRODUCING THE SAME

[75] Inventors: Isao Oda; Tadaaki Matsuhisa, both of Nagoya, Japan

[73] Assignee: NGK Insulators Ltd., Nagoya, Japan

[21] Appl. No.: 152,314

[22] Filed: May 22, 1980

[30] Foreign Application Priority Data

Apr. 2, 1980 [JP] Japan ................... 55/41984

[51] Int. Cl.³ ............... C04B 35/04; C04B 35/18; C04B 35/44; C04B 35/46
[52] U.S. Cl. .............. 501/112; 252/477 R; 501/119; 501/120; 501/121; 501/122; 501/135; 501/128; 501/153; 501/154
[58] Field of Search ............... 106/73.33, 62

[56] References Cited

U.S. PATENT DOCUMENTS

| | | | |
|---|---|---|---|
| 2,776,896 | 1/1957 | Harman et al. | 106/73.33 |
| 3,578,471 | 5/1971 | Lachman | 106/73.33 |
| 3,625,717 | 12/1971 | Grubba et al. | 106/73.33 |
| 4,017,347 | 4/1977 | Cleveland | 106/39.5 X |
| 4,277,539 | 7/1981 | Keller et al. | 106/73.33 |

*Primary Examiner*—Helen M. McCarthy
*Attorney, Agent, or Firm*—Stevens, Davis, Miller & Mosher

[57] ABSTRACT

The invention relates to low-expansion ceramics, the chemical composition of which consists of 1.2 to 20% by weight of magnesia (MgO), 6.5 to 68% by weight of alumina ($Al_2O_3$), 19 to 80% by weight of titanium in terms of titanium oxide ($TiO_2$), 1 to 20% by weight of silica ($SiO_2$), and 0.5 to 20% by weight of iron in terms of ferric oxide ($Fe_2O_3$); the major component of crystalline phase thereof is a solid solution of magnesium oxide-aluminum oxide-titanium dioxide-silicon oxide-iron oxide; the ceramics have a coefficient of thermal expansion of not more than $20 \times 10^{-7}$ (1/°C.) in a temperature range of 25° C. to 800° C., a four-point flexural strength of not smaller than 50 kg/cm² at room temperature, and a melting point of not lower than 1,500° C.; and a method of producing low-expansion ceramics comprising the steps of preparing a batch, plasticizing the batch, if necessary, and shaping the batch; drying the body thus shaped; and firing the shaped body at 1,300° C. to 1,700° C., thereby producing ceramics having a coefficient of thermal expansion of not more than $20 \times 10^{-7}$ (1/°C.) in a temperature range of 25° C. to 800° C., a four-point flexural strength of not smaller than 50 kg/cm² at room temperature, and a melting point of not lower than 1,500° C., and wherein the shape of ceramics is a honeycomb structure.

12 Claims, 2 Drawing Figures

LOW-EXPANSION CERAMICS AND METHOD OF PRODUCING THE SAME

BACKGROUND OF THE INVENTION

This invention relates to low-expansion ceramics having a small coefficient of thermal expansion, a high melting point, and a high mechanical strength. The invention also relates to a method of producing the low-expansion ceramics.

With the progress of technology in recent years, demand for material having an excellent heat-resistance and an excellent thermal shock-resistance is increasing. The thermal shock-resistance of ceramics depends on characteristics of the materials, such as the coefficient of thermal expansion, the heat conductivity, the mechanical strength, the Young's modulus, and the Poisson's ratio. The thermal shock-resistance is also affected by the size and shape of the goods concerned and the conditions of heating and cooling or the rate of heat propagation. Among those factors affecting the thermal shock-resistance, the contribution of the coefficient of thermal expansion is especially large, and when the rate of heat propagation is high, the thermal shock-resistance is ruled almost solely by the coefficient of thermal expansion, as well known to those skilled in the art. Accordingly, there is a strong demand for development of low-expansion material with excellent resistance against thermal shock.

As ceramics with a comparatively low thermal expansion, which has a coefficient of thermal expansion in the order of 5 to $20 \times 10^{-7}$ (1/°C.) in a temperature range of 25° C. to 800° C., cordierite (MAS) and lithium-aluminum-silicate (LAS) are known. However, such known ceramics have a low melting point, e.g., the melting point of cordierite is 1,450° C. and that of lithium-aluminum-silicate is 1,423° C. For instance, when the ceramics honeycomb is used as a catalyst substrate for catalytic purifying apparatus of automobiles, even the honeycomb substrate using cordierite with a high melting point have been found vulnerable to plugging due to melting if the temperature of the catalyst bed is increased by 100° C. to 200° C. over that of conventional catalyst beds. The increase of the temperature of the catalyst bed is caused by modification of the mounting position of the catalytic converter from the conventional location of under bed to engine proximity for improving the purifying efficiency of the catalyst and by modification of design involving the mounting of a turbo-charger for improving the fuel economy and enging output, which modifications cause an increase in the exhaust gas temperature as compared with that of conventional apparatus. Accordingly, the development of low-expansion material having an excellent heat-resistance, which also has an excellent thermal shock-resistance equivalent to or better than that of cordierite, has been strongly demanded.

On the other hand, ceramics with low-expansion characteristics generally have different values of the coefficient of thermal expansion for different directions of crystalline axes of the crystals forming the ceramics, which different values tend to cause thermal stress in the ceramics, and as the thermal stress exceeds critical strengths of the constituent crystals and grain boundaries, micro cracks are formed in grains and grain boundaries to reduce the mechanical strength thereof. For instance, in the case of ceramic honeycombs for catalytic substrate of automobile catalytic purifying apparatus, breakage may be caused in the ceramics as the ceramic honeycomb is pushed into a catalytic converter, or cracks and breakages are easily caused in the ceramics during automobile running due to vibration and other mechanical shocks. To overcome such difficulties, there is a strong demand for developing low-expansion materials having a high strength available for catalytic substrate.

BRIEF SUMMARY OF THE INVENTION

The low-expansion ceramics according to the present invention obviates the aforesaid shortcomings and difficulties of the prior art. The inventors have succeeded in achieving a low-expansion ceramics having a low coefficient of thermal expansion, a high melting point, and high strength, by producing the ceramics with magnesia, alumina, silica, and iron oxide. The low-expansion ceramics of the invention have a chemical composition consisting of 1.2 to 20% by weight of magnesia (MgO), 6.5 to 68% by weight of alumina ($Al_2O_3$), 19 to 80% by weight of titanium in terms of titanium oxide ($TiO_2$), 1 to 20% by weight of silica ($SiO_2$), and 0.5 to 20% by weight of iron in terms of ferric oxide ($Fe_2O_3$), preferably 2 to 17% by weight of magnesia (MgO), 11 to 62% by weight of alumina ($Al_2O_3$), 25 to 75% by weight of titanium in terms of titanium oxide ($TiO_2$), 2 to 15% by weight of silica ($SiO_2$), and 2 to 10% by weight of iron in terms of ferric oxide ($Fe_2O_3$). The low-expansion ceramics of the invention further have a major component of the crystalline phase thereof consisting of a solid solution of magnesium oxide-aluminum oxide-titanium dioxide-silicon oxide-iron oxide, a coefficient of thermal expansion of not more than $20 \times 10^{-7}$ (1/°C.) in a temperature range of 25° C. to 800° C., a four-point flexural strength of not smaller than 50 kg/cm² at room temperature, and a melting point of 1,500° C. or higher.

In this specification, titanium is assumed to be four valency, even though it is able to form non-stoichiometric composition with oxide.

An object of the present invention is to provide low-expansion ceramics essentially consisting of 1.2 to 20% by weight of magnesia (MgO), 6.5 to 68% by weight of alumina ($Al_2O_3$), 19 to 80% by weight of titanium in terms of titanium oxide ($TiO_2$), 1 to 20% by weight of silica ($SiO_2$), and 0.5 to 20% by weight of iron in terms of ferric oxide ($Fe_2O_3$); wherein the major component of crystalline phase thereof is a solid solution of magnesium oxide-aluminum oxide-titanium dioxide-silicon oxide-iron oxide; and the ceramics has a coefficient of thermal expansion of not more than $20 \times 10^{-7}$ (1/°C.) in a temperature range of 25° C. to 800° C., a four-point flexural strength of not smaller than 50 kg/cm² at room temperature, and a melting point of not lower than 1,500° C.

Another object of the present invention is to provide low-expansion ceramics, wherein said chemical composition consists of 2 to 17% by weight of magnesia (MgO), 11 to 62% by weight of alumina ($Al_2O_3$), 25 to 75% by weight of titanium in terms of titanium oxide ($TiO_2$), 2 to 15% by weight of silica ($SiO_2$), and 2 to 10% by weight of iron in terms of ferric oxide ($Fe_2O_3$).

A further object of the present invention is to provide low-expansion ceramics, wherein said ceramics contains as a second crystalline phase not more than 20% by weight of at least one crystal selected from the group consisting of rutile, spinel, mullite, corundum, and cordierite.

A still further object of the present invention is to provide low-expansion ceramics, wherein the shape of ceramics is a honeycomb structure.

Another object of the present invention is to provide a method of producing low-expansion ceramics comprising the steps of preparing a batch of compounds so as to provide a chemical composition of 1.2 to 20% by weight of magnesia (MgO), 6.5 to 68% by weight of alumina ($Al_2O_3$), 19 to 80% by weight of titanium in terms of titanium oxide ($TiO_2$), 1 to 20% by weight of silica ($SiO_2$), and 0.5 to 20% by weight of iron in terms of ferric oxide ($Fe_2O_3$);

plasticizing the batch if necessary and shaping the batch;

drying the body thus shaped; and firing the shaped body at 1,300° C. to 1,700° C., thereby having a coefficient of thermal expansion of not more than $20 \times 10^{-7}$ (1/°C.) in a temperature range of 25° C. to 800° C., a four-point flexural strength of not smaller than 50 kg/cm² at room temperature, and a melting point of not lower than 1,500° C.

DETAILED DESCRIPTION OF THE INVENTION

Figure 1:
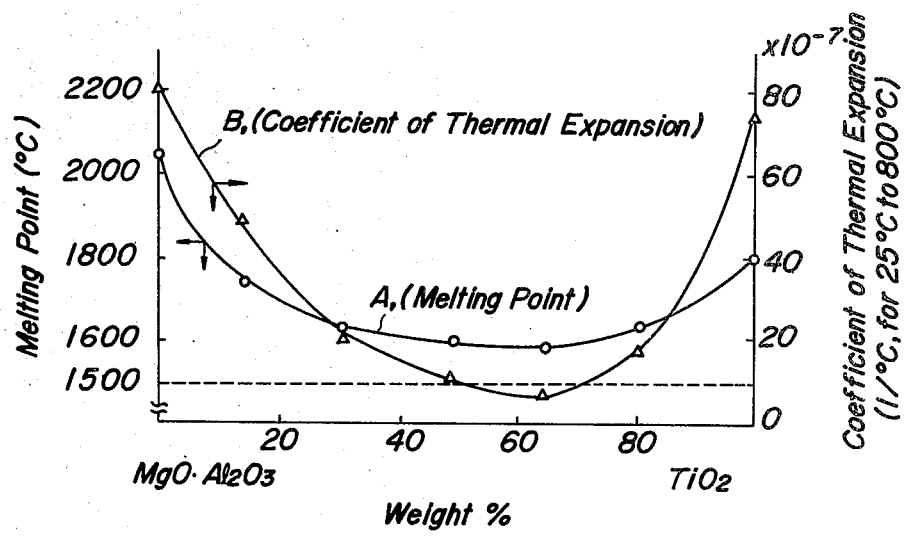
FIG. 1 is a characteristic diagram of ceramics of $MgO \cdot Al_2O_3 \cdot TiO_2$ system, showing the effects of the content of $TiO_2$ on the melting point and the coefficient of thermal expansion.

A method of producing the low-expansion ceramics according to the present invention will be now explained.

A mixture of starting materials selected from the group consisting of magnesia, magnesium carbonate, magnesium hydroxide, talc, alumina, aluminum hydroxide, bauxite, anatase type titanium dioxide, rutile type titanium dioxide, metallic iron, α-type ferric oxide, γ-type ferric oxide, hydrous iron oxide, ilmenite, clay, calcined clay, chamotte, agalmatolite, mullite, sillimanite, and kyanite, so as to provide a chemical composition of 1.2 to 20% by weight of magnesia (MgO), 6.5 to 68% by weight of alumina ($Al_2O_3$), 19 to 80% by weight of titanium in terms of titanium oxide ($TiO_2$), 1 to 20% by weight of silica ($SiO_2$), and 0.5 to 20% by weight of iron in terms of ferric oxide ($Fe_2O_3$). If necessary, a plasticizer is added in the mixture thus formed for obtaining a batch which is formable in a plastic manner, and the batch is formed by a ceramic forming process selected from the processes of extrusion, pressing, slip casting, and injection molding. Thus formed body is dried.

The dried body is then heated by raising its temperature at a rate of 5° C./hr to 300° C./hr and fired at 1,300° C. to 1,700° C., preferably for 0.5 to 48 hours. Whereby, the low-expansion ceramics of the invention is produced.

The starting materials for the low-expansion ceramics of the invention are not restricted to the aforesaid substances, but various natural materials which essentially consist of the aforesaid chemical composition can be also used for producing the low-expansion ceramics.

As pointed out above, the low-expansion ceramics of the present invention can be formed by any of the conventional forming processes available for ceramics. The shape of the final product is not restricted at all: for instance, the final product can be a honeycomb body having a thin walled matrix with a plurality of cells extending from one end to the opposite end thereof and the cross section of the cells of the honeycomb body can be of any geometrical form such as triangular, rectangular, hexagonal, any polygonal, circular, or a combination thereof; a complicatedly shaped three-dimensional body, a thick body, a block of various shapes, or a body of almost any shape and any structure.

The reasons for the various limitations in the present invention are as follows.

(1) 1.2 to 20% by weight of magnesia (MgO), 6.5 to 68% by weight of alumina ($Al_2O_3$), and 19 to 80% by weight of titanium in terms of titanium oxide ($TiO_2$):

Binary ceramics of magnesia-alumina system produces spinel crystals and gives a melting point of 2,000° C. or higher, so that magnesia and alumina are very useful ingredients for improving the heat-resistance. Although the value of the coefficient of thermal expansion of the binary ceramics vary somewhat depending on the composition thereof, if is about 60 to $80 \times 10^{-7}$ (1/°C.) and very large. On the other hand, the present invention relates to low-expansion ceramics with a coefficient of thermal expansion of not more than $20 \times 10^{-7}$ (1/°C.). As can be seen from FIG. 1, if 19 to 80% by weight of titanium in terms of titanium oxide is added to the binary system of magnesia-alumina, the ternary system thus produced has a coefficient of thermal expansion of not more than $20 \times 10^{-7}$ (1/°C.), while keeping the melting point thereof above 1,500° C. If the addition of titania exceeds 80% by weight, the melting point increases with the amount of the titania, but the coefficient of thermal expansion rapidly increases into a range of 20 to $80 \times 10^{-7}$ (1/°C.), so that the addition of titania should not exceed 80% by weight. On the other hand, if the addition of titania is not more than 19% by weight, although the melting point increases to 1,700° C. to 2,000° C., the coefficient of thermal expansion rapidly increases to an excessively large range of 20 to $80 \times 10^{-7}$ (1/°C.), so that at least 19% by weight of titanium in terms of titanium oxide must be added, while considering the amounts of other ingredients of ferric oxide ($Fe_2O_3$) and silica ($SiO_2$).

(2) 0.5 to 20% by weight of ferric oxide ($Fe_2O_3$):

The reason for limiting the amount of iron from 0.5 to 20% by weight in terms of ferric oxide is in that the addition of iron in this range prevents variation of the coefficient of thermal expansion when the ceramics is exposed to various heat treatments, especially to heat treatment of constant temperature for many hours such as at about 1,000° C. to 1,200° C. for 2,000 hours or repeatedly heating up and cooling down. The addition of iron at the aforesaid rate also gives low-expansion ceramics having a small coefficient of thermal expansion of less than $20 \times 10^{-7}$ (1/°C.) in a temperature range of 25° C. to 800° C. and a high melting point of 1,500° C. or higher. If the amount of iron in the ceramics becomes less than 0.5% by weight in terms of ferric oxide, the variation of the coefficient of thermal expansion becomes too large when the ceramics is exposed to heat treatment, especially that of constant temperature for many hours, e.g., at from about 1,000° C. to 1,200° C. for more than 2,000 hours or that of repeatedly heating up and cooling down. On the other hand, if the amount of iron in the ceramics exceeds 20% by weight in terms of ferric oxide, the melting point becomes smaller than 1,500° C. resulting in an inferior heat-resistance and the coefficient of thermal expansion in the temperature range of 25° C. to 800° C. exceeds $20 \times 10^{-7}$ (1/°C.), so that the thermal shock-resistance becomes inferior.

Figure 2:
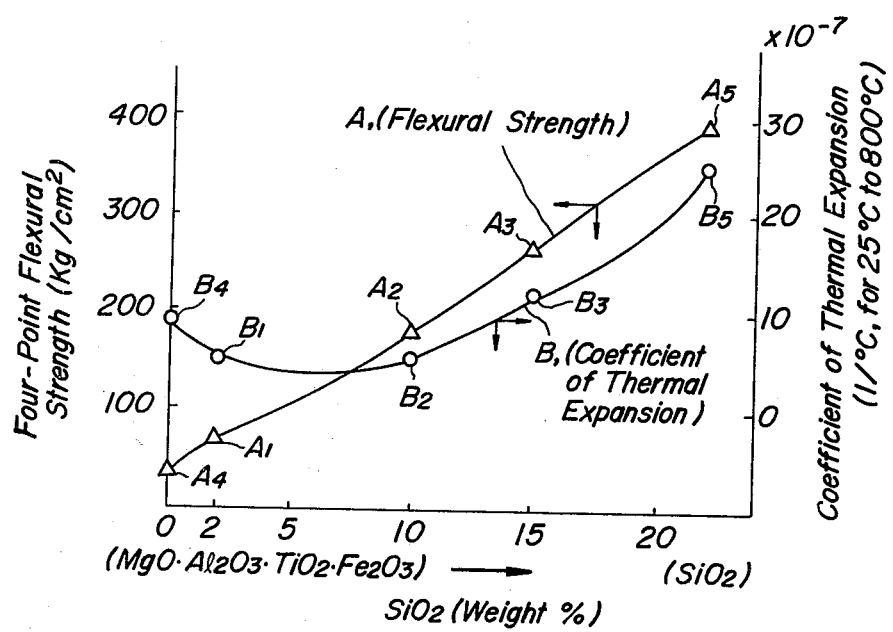
FIG. 2 is a characteristic diagram of the low-expansion ceramics of the Examples 1 through 3 of the invention and the ceramics of References 1 and 2, showing the effects of the content of $SiO_2$ on the flexural strength and the coefficient of thermal expansion.

(3) 1 to 20% by weight of silica ($SiO_2$):

Referring to FIG. 2, the reason for limiting the content of silica to 1 to 20% by weight in the chemical composition of the present invention is in that if the content of silica is less than 1% by weight, the four-point flexural strength becomes less than 50 kg/cm² and the strength of the low-expansion ceramics becomes insufficient. On the other hand, if the content of silica exceeds 20% by weight, high mechanical strength can be achieved but production of different crystalline phases increases so much that the coefficient of thermal expansion becomes larger than $20 \times 10^{-7}$ (1/°C.) resulting in an inferior thermal shock-resistance. Thus, the content of silica is determined to be 1 to 20% by weight.

Although the major component of the crystalline phase of the low-expansion ceramics of the present invention is a solid solution of magnesium oxide-aluminum oxide-titanium dioxide-silicon oxide-iron oxide, the present invention allows the presence of not more than 20% by weight, preferably not more than 10% by weight, of a second crystalline phase consisting of at least one crystal selected from the group consisting of rutile, spinel, mullite, corundum, and cordierite, because this range of the second crystalline phase has effects of improving the heat-resistance and strength by increasing the softening temperature and the melting temperature and reducing the gradient of softening-shrinkage curve from the softening temperature to the melting temperature without deteriorating the low-expansion characteristics.

Examples of the present invention will be now explained.

Referring to Table 1, compositions of Examples 1 through 5 of the invention and References 1 and 2 were prepared by weighing starting materials. Two parts by weight of a binder of vinyl acetate system were added to 100 parts by weight of the composition thus prepared, and the binder was mixed thoroughly with the composition, and then rod-shaped test pieces of 10 mm × 10 mm × 80 mm were made by pressing at a pressure of 1,000 kg/cm².

Separately, honeycomb-shaped bodies with square cell cross section were prepared, by adding 4 parts by weight of metnyl cellulose and 30 to 40 parts by weight of water into 100 parts by weight of each of the aforesaid compositions, thoroughly kneading the mixture thus formed by a kneader, extruding the kneaded mixture into honeycomb shape by an extrusion machine, and drying the extruded goods. The rod-shaped test pieces and the honeycomb-shaped bodies thus formed were fired under the firing conditions of Table 1, whereby ceramics of the Examples 1 through 5 of the invention and References 1 and 2 were made.

The coefficients of thermal expansion in the temperature range of 25° C. to 800° C. and the melting points of the rod-shaped test pieces of the Examples 1 through 5 of the invention and References 1 and 2 were measured. A specimen of 4 mm width, 3 mm thickness, and 45 mm length was prepared from each one of the rod-shaped test pieces by cutting and then grinding. The four-point flexural strength of the specimen was measured under the conditions of an inside span 10 mm, an outside span 30 mm, and a loading rate of 0.5 mm/min.

Thermal shock tests were applied on the honeycomb-shaped bodies of 100 mm diameter and 75 mm length for the Examples 1 through 5 of the invention and References 1 and 2 by an electric furnace, and withstanding temperature differences for quick heating and quick cooling without cracks or breakage were determined.

The results are shown in Table 1.

TABLE 1

|  |  |  | Examples of the invention ||||| References ||
|---|---|---|---|---|---|---|---|---|---|
|  |  |  | 1 | 2 | 3 | 4 | 5 | 1 | 2 |
| Chemical composition | MgO | (Wt %) | 4.3 | 2.9 | 2.1 | 3.0 | 6.0 | 4.6 | 0.9 |
|  | $Al_2O_3$ | (Wt %) | 37.8 | 48.9 | 54.8 | 48.2 | 27.3 | 35.0 | 65.6 |
|  | $TiO_2$ | (Wt %) | 50.4 | 34.4 | 25.4 | 36.9 | 50.1 | 54.4 | 10.4 |
|  | $SiO_2$ | (Wt %) | 2.0 | 10.0 | 15.0 | 7.8 | 12.1 | — | 22.0 |
|  | $Fe_2O_3$ | (Wt %) | 5.5 | 3.8 | 2.7 | 4.1 | 4.5 | 6.0 | 1.1 |
| Composition ingredients | Magnesia | (Wt %) | 4.5 | 3.1 | 2.2 | — | — | 4.8 | 1.0 |
|  | Magnesium carbonate | (Wt %) | — | — | — | 3.0 | 11.7 | — | — |
|  | Talc | (Wt %) | — | — | — | 4.9 | — | — | — |
|  | Alumina | (Wt %) | 30.9 | 21.1 | 15.0 | — | — | 33.3 | 6.4 |
|  | Bauxite | (Wt %) | — | — | — | 46.4 | — | — | — |
|  | Mullite | (Wt %) | 7.4 | 36.7 | 54.1 | 6.5 | 34.4 | — | 80.8 |
|  | Silica | (Wt %) | — | — | — | — | 1.6 | — | — |
|  | Ilmenite | (Wt %) | — | — | — | — | 9.9 | — | — |
|  | Titania | (Wt %) | 51.8 | 35.4 | 26.1 | 35.7 | 42.4 | 55.7 | 10.7 |
|  | Ferric oxide | (Wt %) | 5.4 | 3.7 | 2.6 | 3.5 | — | 6.2 | 1.1 |
| Firing conditions | Temperature | (°C.) | 1500 | 1500 | 1500 | 1500 | 1450 | 1500 | 1450 |
|  | Retention time | (hr) | 5 | 5 | 5 | 3 | 10 | 5 | 5 |
| Coefficient of thermal expansion ($\times 10^{-7}$ for 25° C. for 800° C.) |  | (1/°C.) | 5 | 5 | 12 | 0 | 3 | 9 | 25 |
| Melting point |  | (°C.) | 1700 | 1680 | 1640 | 1690 | 1720 | 1710 | 1550 |
| Four-point flexural strength |  | (kg/cm²) | 70 | 160 | 270 | 100 | 350 | 30 | 390 |
| Temperature difference for |  | (°C.) | 1050 | 1150 | 850 | 1300 | 1250 | 800 | 450 |

TABLE 1-continued

| | Examples of the invention | | | | | References | |
|---|---|---|---|---|---|---|---|
| | 1 | 2 | 3 | 4 | 5 | 1 | 2 |
| quick heating and quick cooling | | | | | | | |

The Examples 1 through 5 of the invention showed coefficients of thermal expansion of not more than $20 \times 10^{-7}$ (1/°C.) in the temperature range of 25° C. to 800° C., so that they showed larger withstanding temperature differences for quick heating and quick cooling than those of References 1 and 2, as demonstrated by the thermal shock tests by the electric furnace. Thus, the Examples of the invention proved excellent thermal shock-resistance.

Furthermore, the Examples 1 through 5 of the invention showed four-point flexural strengths of more than 50 kg/cm². i.e., sufficient strength for practical applications, and high melting points of not lower than 1,500° C.

FIG. 1 is a characteristic diagram of magnesia-alumina-titania ternary ceramics, showing the effect of the content of titania on the melting point and the coefficient of thermal expansion. In the figure, the curve A shows the relationship between the content of titania and the melting point of the ceramics, while the curve B shows the relationship between the content of titania and the coefficient of thermal expansion of the ceramics in the temperature range of 25° C. to 800° C. As apparent from the figure, the addition of titania has effects of outstandingly reducing the coefficient of thermal expansion.

FIG. 2 is a characteristic diagram of low-expansion ceramics of the Examples 1 through 3 of the invention and the ceramics of References 1 and 2, showing the effects of the content of silica on the flexural strength and the coefficient of thermal expansion. In the figure, the curve A shows the relationship between the content of silica and the four-point flexural strength of the ceramics concerned, while the curve B shows the relationship between the content of silica and the coefficient of thermal expansion of the ceramics concerned in the range of 25° C. to 800° C. Points $A_1$ and $B_1$ for the silica content 2% belong to the Example 1 of the invention; points $A_2$ and $B_2$ for the silica content 10% belong to the Example 2 of the invention; points $A_3$ and $B_3$ for the silica content 15% belong to the Example 3 of the invention; points $A_4$ and $B_4$ for the silica content 0% belong to Reference 1; and points $A_5$ and $B_5$ for silica content 22% belong to Reference 2. As apparent from FIG. 2, the addition of silica has effects of outstanding improving the flexural strength of the ceramics.

As described in the foregoing, the low-expansion ceramics of the present invention has a low coefficient of thermal expansion, a high strength, a high melting point, and a high thermal stability even after being exposed to heat treatment for a number of hours at any temperature up to 1,400° C. Whereby, the ceramics of the invention can be widely used as ceramic material in the fields where high degrees of heat-resistance, thermal shock-resistance, wear-resistance, and corrosion-resistance are required; for instance, substrate for catalytsts to purify automobile exhaust gas; carriers for catalytic combustion; filters for diesel exhaust particulate; industrial or automobile ceramic heat exchangers; engine parts such as pistons, cylinder liners, combustion chambers, auxiliary combustion chambers, turbo-charger rotors or the like, gas turbine parts such as nozzles, rotors, shrouds, scrolls, plenum, combustors, tail cylinders, or the like; heat-resistance ceramic materials for receivers of solar energy; various refractory materials; and chinawares and porcelains for chemical industries. Therefore, the present invention contributes greatly to the industry.

What is claimed is:

1. Low-expansion ceramics having the chemical composition of the ceramics essentially consisting of 1.2 to 20% by weight of magnesia (MgO), 6.5 to 68% by weight of alumina ($Al_2O_3$), 19 to 80% by weight of titanium in terms of titanium oxide ($TiO_2$), 1 to 20% by weight of silica ($SiO_2$), and 0.5 to 20% by weight of iron in terms of ferric oxide ($Fe_2O_3$); wherein the major component of crystalline phase thereof is a solid solution of magnesium oxide-aluminum oxide-titanium dioxide-silicon oxide-iron oxide; and the ceramics has a coefficient of thermal expansion of not more than $20 \times 10^{-7}$ (1/°C.) in a temperature range of 25° C. to 800° C., a four-point flexural strength of not smaller than 50 kg/cm² at room temperature, and a melting point of not lower than 1,500° C.

2. Low-expansion ceramics as defined in claim 1, wherein said chemical composition consists of 2 to 17% by weight of magnesia (MgO), 11 to 62% by weight of alumina ($Al_2O_3$), 25 to 75% by weight of titanium in terms of titanium oxide ($TiO_2$), 2 to 15% by weight of silica ($SiO_2$), and 2 to 10% by weight of iron in terms of ferric oxide ($Fe_2O_3$).

3. Low-expansion ceramics as defined in claim 1, wherein said ceramics contains as a second crystalline phase not more than 20% by weight of at least one crystal selected from the group consisting of rutile, spinel, mullite, corundum, and cordierite.

4. Low-expansion ceramics as defined in claim 1, wherein the shape of ceramics is a honeycomb structure.

5. A method of producing low-expansion ceramics comprising steps of preparing a batch of compounds so as to provide a chemical composition of 1.2 to 20% by weight of magnesia (MgO), 6.5 to 68% by weight of alumina ($Al_2O_3$), 19 to 80% by weight of titanium in terms of titanium oxide ($TiO_2$), 1 to 20% by weight of silica ($SiO_2$), and 0.5 to 20% by weight of iron in terms of ferric oxide ($Fe_2O_3$); plasticizing the batch if necessary and shaping the batch; drying the body thus shaped; and firing the shaped body at 1,300° C. to 1,700° C., thereby having a coefficient of thermal expansion of not more than $20 \times 10^{-7}$ (1/°C.) in a temperature range of 25° C. to 800° C., a four-point flexural strength of not smaller than 50 kg/cm² at room temperature, and a melting point of not lower than 1,500° C.

6. A method of producing low-expansion ceramics as defined in claim 5, wherein said batch provides a chemical composition consisting of 2 to 17% by weight of magnesia (MgO), 11 to 62% by weight of alumina ($Al_2O_3$), 25 to 75% by weight of titanium in terms of titanium oxide ($TiO_2$), 2 to 15% by weight of silica ($SiO_2$), and 2 to 10% by weight of iron in terms of ferric oxide ($Fe_2O_3$).

7. A method of producing low-expansion ceramics as defined in claim 5, wherein at least a part of material providing said silica ($SiO_2$) is mullite.

8. A method of producing low-expansion ceramics as defined in claim 7, wherein 3.5 to 60% by weight of mullite is added for providing said silica.

9. Low-expansion ceramics having a solid solution of magnesium oxide-aluminum oxide-titanium dioxide-silicon oxide-iron oxide as the major component of crystalline phase thereof, a coefficient of thermal expansion of not more than $20 \times 10^{-7}$ (1/°C.) in a temperature range of 25° C. to 800° C., a four-point flexural strength of not smaller than 50 kg/cm$^2$ at room temperature, and a melting point of not lower than 1,500° C., said low-expansion ceramics being prepared by the method comprising the steps of preparing a batch of compounds so as to provide a chemical composition of 1.2 to 20% by weight of magnesia (MgO), 6.5 to 68% by weight of alumina ($Al_2O_3$), 19 to 80% by weight of titanium in terms of titanium oxide ($TiO_2$), 1 to 20% by weight of silica ($SiO_2$), and 0.5 to 20% by weight of iron in terms of ferric oxide ($Fe_2O_3$); plasticizing the batch and shaping the batch; drying the body thus shaped; and firing the shaped body at 1,300° C. to 1,700° C.

10. Low-expansion ceramics as defined in claim 9, wherein said batch provides a chemical composition consisting of 2 to 17% by weight of magnesia (MgO), 11 to 62% by weight of alumina ($Al_2O_3$), 25 to 75% by weight of titanium in terms of titanium oxide ($TiO_2$), 2 to 15% by weight of silica ($SiO_2$), and 2 to 10% by weight of iron in terms of ferric oxide ($Fe_2O_3$).

11. Low-expansion ceramics as defined in claim 9, wherein at least a part of material providing said silica ($SiO_2$) is mullite.

12. Low-expansion ceramics as defined in claim 9, wherein 3.5 to 60% by weight of mullite is added for providing said silica.

* * * * *